(12) United States Patent
Tanaka et al.

(10) Patent No.: US 11,297,195 B2
(45) Date of Patent: Apr. 5, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Shogo Tanaka, Kanagawa (JP); Kenji Sawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/140,533

(22) Filed: Jan. 4, 2021

(65) Prior Publication Data

US 2022/0030127 A1    Jan. 27, 2022

(30) Foreign Application Priority Data

Jul. 22, 2020    (JP) .............................. JP2020-125718

(51) Int. Cl.
*G06F 3/12*    (2006.01)
*H04N 1/00*    (2006.01)

(52) U.S. Cl.
CPC ..... *H04N 1/00771* (2013.01); *H04N 1/00408* (2013.01); *H04N 1/00726* (2013.01)

(58) Field of Classification Search
CPC ........... H04N 1/00771; H04N 1/00408; H04N 1/00726; H04N 1/00729; H04N 1/00737
See application file for complete search history.

(56) References Cited

U.S. PATENT DOCUMENTS

2003/0123894 A1* 7/2003 Ueda ................ G03G 15/6582
                                                                 399/81
2018/0308386 A1* 10/2018 Yamada ............... G09B 19/003

FOREIGN PATENT DOCUMENTS

JP           H05-208781 A      8/1993

* cited by examiner

*Primary Examiner* — Moustapha Diaby
(74) *Attorney, Agent, or Firm* — Oliff PLC

(57) ABSTRACT

An information processing apparatus includes: a processor configured to: acquire information on a folding manner in which a folding device folds a medium; and when the folding manner does not allow reading of a folding position of the medium with the medium folded, cause a display to display information so as to prompt a user to unfold and read the medium.

8 Claims, 10 Drawing Sheets

FIG. 6

| FOLDING MANNER | DIVISION NUMBER | SURFACE | INSIDE LINE | CLOSER SIDE | FARTHER SIDE |
|---|---|---|---|---|---|
| HALF-FOLD | 2 | FIRST SURFACE | SHEET EDGE 1 | SHEET EDGE 2 | FOLDING LINE |
| | 2 | SECOND SURFACE | NONE | NONE | NONE |
| TRI-FOLD | 3 | FIRST SURFACE | SHEET EDGE 1 | FOLDING LINE 2 | FOLDING LINE 1 |
| | 3 | SECOND SURFACE | NONE | NONE | NONE |
| 6-PAGE ACCORDION FOLD | 3 | FIRST SURFACE | SHEET EDGE 1 | FOLDING LINE 2 | FOLDING LINE 1 |
| | 3 | SECOND SURFACE | SHEET EDGE 2 | FOLDING LINE 1 | FOLDING LINE 2 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-125718 filed on Jul. 22, 2020.

BACKGROUND

(i) Technical Field

The present disclosure relates to an information processing apparatus and a non-transitory computer readable medium.

(ii) Related Art

Attempts have been made to automatically detect a folding deviation amount at a folding position where a medium is folded by a folding device, in order to adjust the folding position such that the medium folded by the folding device is to be folded at a desired folding position. Such automatic detection methods include a method of detecting a folding deviation amount with a sheet being folded, and a method of detecting a folding deviation amount with a sheet being unfolded.

For example, JP-A-H05-208781 discloses a sheet folding device that stores a position where an adjustment sheet is folded, that is, a position of a stopper for each combination of a sheet size and a folding manner in a storage device (such as a semiconductor memory) in advance, and when a user selects a predetermined combination, reads a corresponding folding position (position of the stopper) from the memory to change the position of the stopper.

SUMMARY

Considering (i) time and effort required to open a folded sheet during detection of a deviation amount of a folding position where the sheet is folded by the folding device and (ii) the fact that the detection is made during sheet transportation, it can be said that detecting a folding deviation amount with a sheet being folded is superior in terms of a point that an amount of work is smaller. On the other hand, if a sheet is folded in a manner that does not allow determining of a folding deviation amount based on an external shape of the folded sheet, it is difficult to detect the folding deviation amount with the sheet being folded. When an operator reads an image of a folded medium with a scanner to detect a folding deviation amount at a folding position during automatic detection of the folding deviation amount, the operator may not know whether to read the image with the folded medium open, or to read the image with the folded medium remaining folded.

Aspects of non-limiting embodiments of the present disclosure relate to an information processing apparatus and a non-transitory computer readable medium that instructs an operator as to how to read an image of a medium in order to detect a deviation amount of a folding position.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: acquire information on a folding manner in which a folding device folds a medium; and when the folding manner does not allow reading of a folding position of the medium with the medium folded, cause a display to display information so as to prompt a user to unfold and read the medium.

BRIEF DESCRIPTION OF THE DRAWINGS

Exemplary embodiment(s) of the present disclosure will be described in detail based on the following figures, wherein:

FIG. 6 is a table showing a relationship among lines obtained by image analysis, a sheet edge(s), and a folding line(s);

DETAILED DESCRIPTION

1. Configuration

Figure 1:
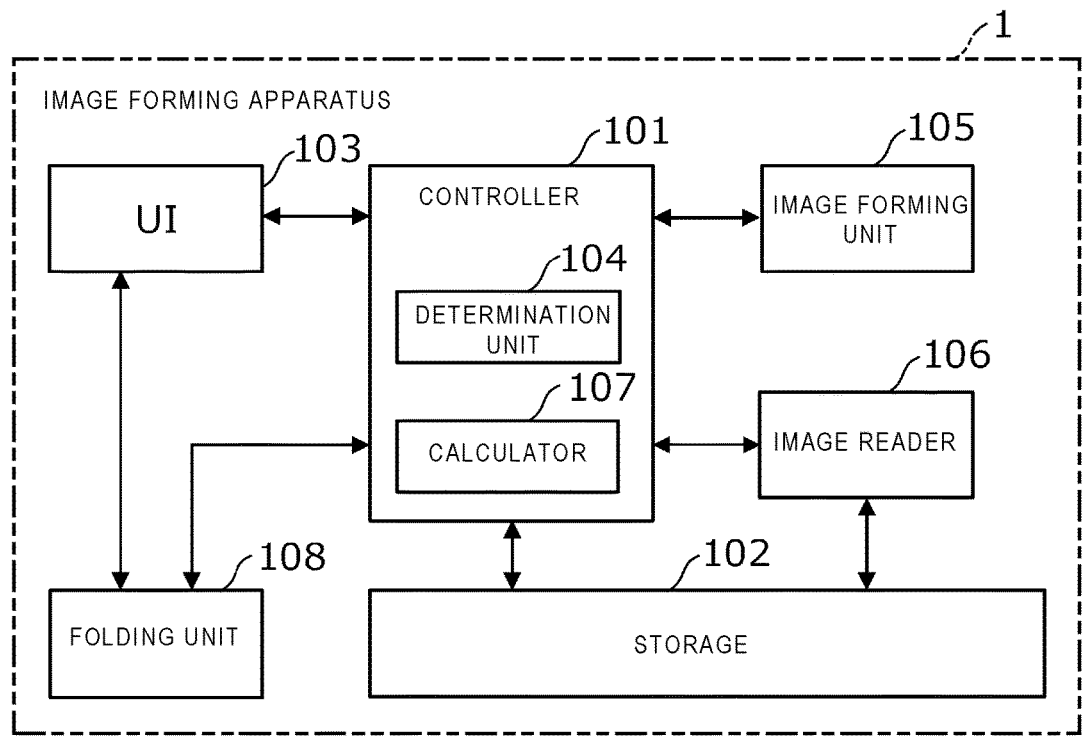
FIG. 1 is a block diagram showing a functional configuration of an image forming apparatus.

FIG. 1 is a block diagram showing a functional configuration of an image forming apparatus 1 according to an exemplary embodiment. The image forming apparatus 1 of the present exemplary embodiment performs (i) a process of receiving, from a user interface (hereinafter referred to as a "UI"), an instruction to fold a sheet, (ii) a process of forming an image on the sheet, (iii) a process of folding the sheet, (iv) a process of reading (that is, scanning) the image formed on the sheet, (v) a process of detecting a folding position of the sheet, and (vi) a process of adjusting the folding position of the sheet. Here, the "folding position" refers to a position where the image forming apparatus 1 folds the sheet. The "sheet" is an example of a medium.

The image forming apparatus 1 includes a controller 101, a storage 102, a UI 103, a determination unit 104, an image forming unit 105, an image reader 106, a calculator 107, and a folding unit 108. The controller 101 executes various processes according to a program stored in the storage 102.

The controller 101 is connected to the UI 103, the image forming unit 105, the image reader 106, and the folding unit 108, and controls these units. The folding unit 108 is an example of a folding device.

The controller 101 is an example of an information processing apparatus. The controller 101 includes a processor such as a central processing unit (CPU). The storage 102 stores the program to be executed by the controller 101, information related to a folding manner, and information obtained in the folding position adjustment process. The storage 102 includes a recording device such as a read only memory (ROM), a random access memory (RAM), or a flash memory. The UI 103 provides the user interface. Specifically, the UI 103 displays a screen related to a function of the image forming apparatus 1, such as a screen related to the folding position adjustment process, and a screen for receiving an operation input by a user. The UI 103 includes a display device such as a liquid crystal display, and an input device such as a touch screen.

The controller 101 includes the determination unit 104 and the calculator 107. The determination unit 104 determines a method of detecting a folding deviation amount based on a folding manner and a sheet type the user selects. Here, the "folding deviation amount" refers to a distance (length) between an actual folding position and a reference folding position. The "reference folding position" refers to an ideal folding position of a sheet. The reference folding position is defined for each folding manner. For example, the reference folding position is a position at which the sheet is equally divided into plural areas. The "actual folding position" refers to a position of a fold actually formed on the sheet in the folding process performed by the folding unit 108. The calculator 107 detects the folding deviation amount based on the determined detection method. Furthermore, the calculator 107 calculates an adjustment value for adjusting the folding position. The image forming unit 105 forms an image on the sheet. The image reader 106 reads a surface condition of the sheet as an image. It is noted that the "surface condition" includes the image formed on the sheet. The folding unit 108 folds the sheet based on the instruction input by the user. For example, the folding unit 108 has (i) a function of creating a booklet by stacking plural sheets, saddle stitching the sheets, and then folding the sheets in half, and (ii) a function of stacking plural sheets and stapling the stacked sheets at a predetermined position on a peripheral edge portion of the stacked sheets.

Figure 2:
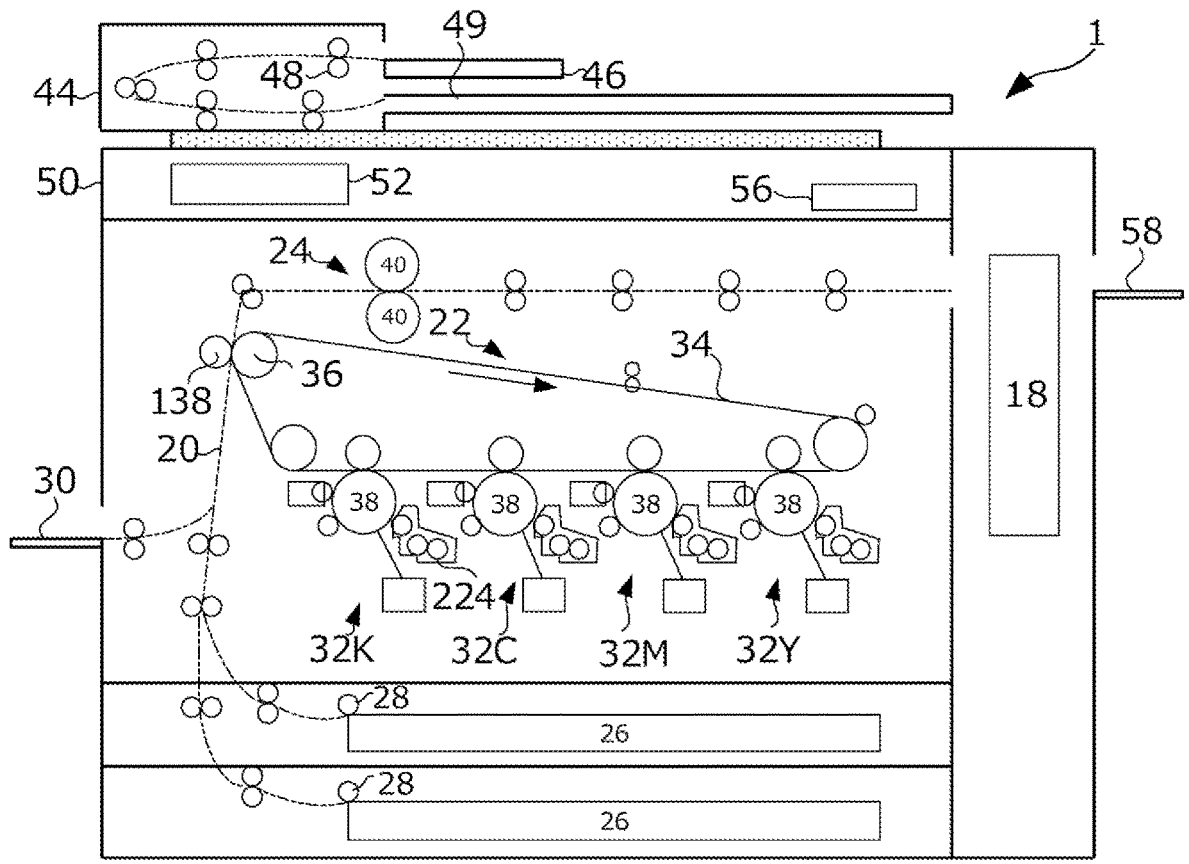
FIG. 2 is a schematic diagram of the image forming apparatus according to an exemplary embodiment.

FIG. 2 is a schematic diagram showing the image forming apparatus 1 according to the exemplary embodiment. The image forming apparatus 1 includes a transport path 20, trays 26, feed rollers 28, a manual feed tray 30, and an automatic transport unit 44. The transport path 20 is a path that transports a sheet from the sheet tray 26 to the folding unit 108. For example, plural rollers and motors that drive the rollers are provided on the transport path 20. One end of the transport path 20 is connected to each sheet tray 26. The other end thereof is connected to the folding unit 108. The sheet is transported from a predetermined location (for example, the tray 26 or the manual feed tray 30) on the transport path 20 to another location (for example, the image forming unit 105 or the folding unit 108) on the transport path 20.

The tray 26 accommodates sheets. Although the two trays 26 are shown in FIG. 2, more trays 26 may be provided. The trays 26 accommodate, for example, different types of sheets. The feed roller 28 feeds the sheet accommodated in the tray 26 to the transport path 20. The sheets may be stacked on the manual feed tray 30.

In this example, the image forming apparatus 1 is an electrophotographic image forming apparatus. The image forming unit 105 includes a toner image forming unit 22 and a fixing unit 24. The toner image forming unit 22 forms a toner image on the sheet. Specifically, the toner image forming unit 22 acquires image signals of respective colors of yellow (Y), magenta (M), cyan (C), and black (K) that are generated based on image data of the respective colors of Y, M, C, and K. The toner image forming unit 22 includes developing units 32Y, 32M, 32C, 32K, a transfer belt 34, a transfer roller 36, and a roller 138. The toner image forming unit 22 forms toner images of the respective colors of Y, M, C, and K on photoconductor drums 38Y, 38M, 38C, and 38K with the developing units 32Y, 32M, 32C, and 32K based on the acquired image signals, and superimposes the formed toner images on the transfer belt 34. The transfer belt 34 is wound around plural rollers including the transfer rollers 36 near the transport path 20. The transfer belt 34 is rotationally driven as an intermediate image carrier. The transfer belt 34 transfers the superimposed toner images onto the sheet. The transfer belt 34 is in contact with the photoconductor drums 38Y, 38M, 38C, and 38K provided in the developing units 32Y, 32M, 32C, and 32K. The transfer roller 36 and the roller 138 sandwich the sheet and the transfer belt 34, and transfer the toner image of the transfer belt 34 onto the sheet. The transfer roller 36 faces the roller 138. The sheet is transported between the transfer roller 36 and the roller 138 on the transport path 20. The fixing unit 24 fixes the toner image formed on the sheet to form an image on the sheet. The fixing unit 24 includes a pair of fixing rollers 40. The fixing unit 24 heats the sheet while applying pressure thereon in a state where the sheet transported between the fixing rollers 40 is sandwiched by the fixing rollers 40.

The image reader 106 includes the automatic transport unit 44, an exposure optical system 50, and a solid-state imaging element CCD 56. The image reader 106 is located below a platen glass PG. The automatic transport unit 44 transports a sheet stacked on a sheet feeding tray 46 to the image reader 106. The automatic transport unit 44 includes the sheet feeding tray 46, platen rollers 48, and a sheet discharge tray 49. The sheets whose images are to be read are stacked in the sheet feeding tray 46. The stacked sheet is fed from the sheet feeding tray 46 to the platen rollers 48. The platen rollers 48 transport the fed sheet onto the platen glass PG. The sheet is discharged to the sheet discharge tray 49 after the image reading is completed. Although illustration and description of a detailed configuration of the image reader 106 are omitted, the image reader 106 can read both sides of the sheet.

The exposure optical system 50 reads the image of the sheet. Specifically, the exposure optical system 50 emits light from a light source 52 to the sheet fed onto the platen glass PG or a sheet that the user places on the platen glass PG, and receives reflected light from the sheet. The solid-state imaging element CCD 56 converts the received reflected light into an electric signal. The exposure optical system 50 includes the light source 52 and plural mirrors. When an image of the sheet that is placed on the platen glass PG by the user is read, the exposure optical system 50 moves to scan the sheet.

The folding unit 108 includes a folding mechanism 18 and a discharge tray 58. The folding mechanism 18 folds the sheet based on the instruction input by the user. The folded sheet is discharged to the discharge tray 58.

In the process of detecting the folding position of the sheet, depending on the folding manner selected by the user, a device may not be able to detect the folding position of the sheet unless the folded sheet is unfolded. Therefore, the image forming apparatus addresses this issue.

2. Operation 2-1. First Example

Figure 3:
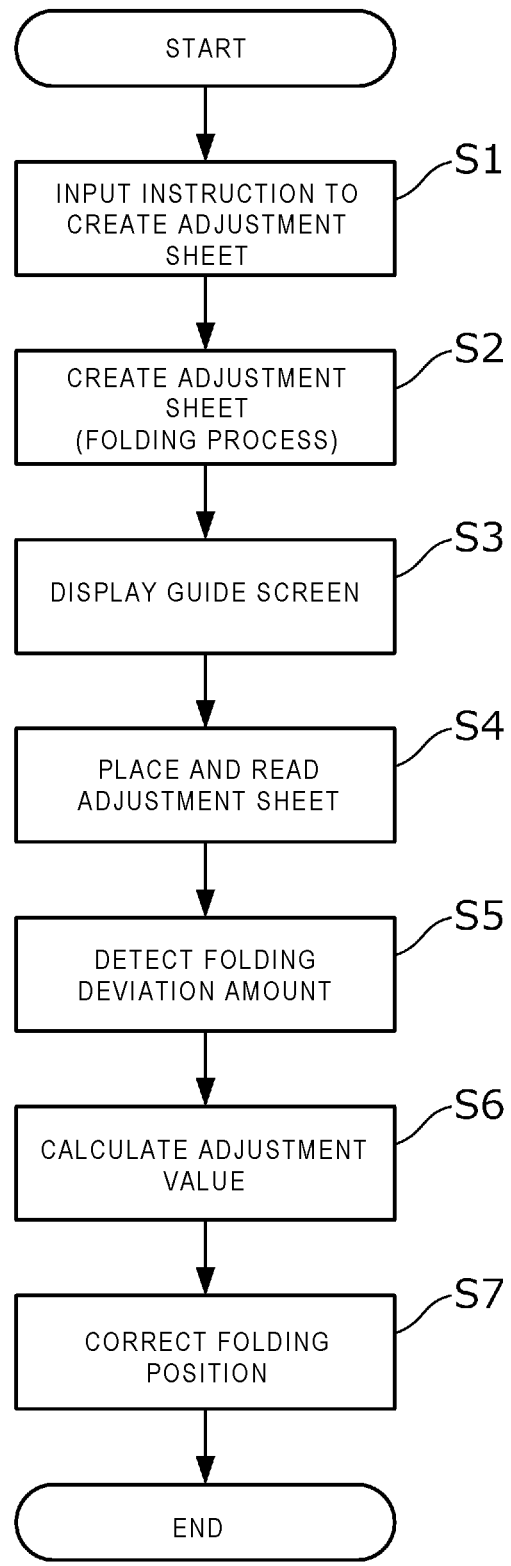
FIG. 3 is a flowchart of an example of a folding position adjustment process.

FIG. 3 is a flowchart of an example of the folding position adjustment process performed by the image forming apparatus 1. The image forming apparatus 1 is, for example, a commercial printer that prints a large amount of booklets such as brochures. When the user wants to adjust a folding deviation of a sheet, the image forming apparatus 1 prints a test print adjustment sheet, and detects a folding deviation amount using the adjustment sheet before printing a sheet used for an actual booklet. Here, the "adjustment sheet" refers to a sheet used for the folding position adjustment process. The image forming unit 105 forms, on the adjustment sheet, a pattern image that facilitates detecting of a folding line. Alternatively, the image forming unit 105 may not form any image on the adjustment sheet, or may form contents such as characters and images to be printed on the actual booklet. When the actual booklet is created by binding, for example, 5 sheets, the number of the adjustment sheet may be 1 or may be 5.

In step S1, the UI 103 receives a user's input of an instruction to create an adjustment sheet creation. This creation instruction may be input by the user from, for example, a personal computer (hereinafter referred to as "PC") connected to a network. The creation instruction includes folding manner information. Here, the "folding manner information" refers to information including an identifier of the folding manner and an identifier of a sheet.

Figure 4A:
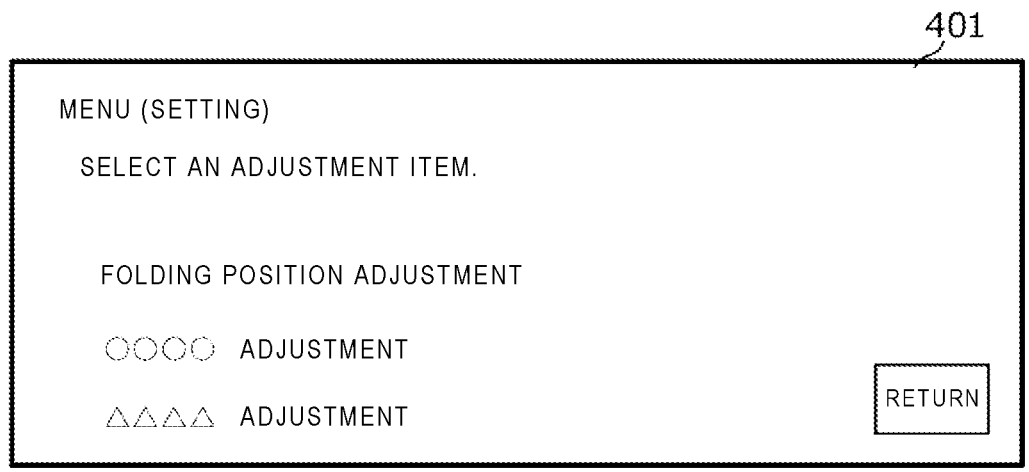
FIGS. 4A to 4C are diagrams showing examples of menu screens in the folding position adjustment process.
Figure 4B:
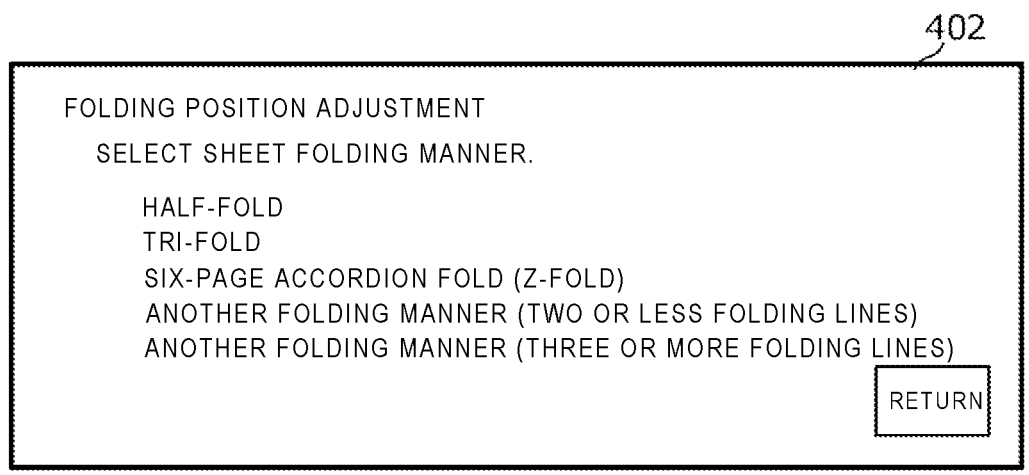
Figure 4C:
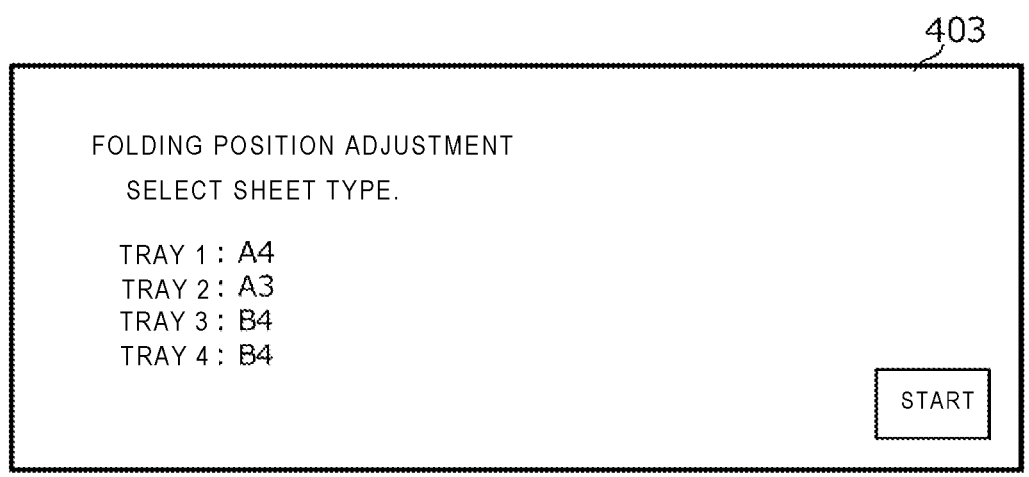

FIGS. 4A to 4C are diagrams showing examples of menu screens in the folding position adjustment process displayed on the UI 103. The UI 103 first displays a menu screen. FIG. 4A is a diagram showing an example of the menu screen. On a screen 401, for example, displayed is a list of items that the user can set in the image forming apparatus 1. The user selects a desired process, here, "folding position adjustment". The UI 103 receives the selection of the "folding position adjustment" from the user.

When the user inputs the selection of the "folding position adjustment", the UI 103 then displays a screen for the user to select a sheet folding manner. FIG. 4B is a diagram showing an example of the screen that allows the user to select the sheet folding manner. On a screen 402, displayed is a list of folding manners that are available in the folding unit 108, such as "half-fold" and "tri-fold". The UI 103 receives a selection of the folding manner from the user.

When the user inputs a selection of the "sheet folding manner", the UI 103 then displays a screen that allows the user to select a sheet type. FIG. 4C is a diagram showing an example of the screen that allows the user to select a sheet type. On a screen 403, displayed is a list of types of sheets accommodated in the trays 26, such as "tray 1: A4" and "tray 2: A3". The UI 103 receives a selection of the sheet type from the user.

When the user inputs a selection of the "sheet type", the UI 103 then receives a user's input of an instruction to create an adjustment sheet. On the screen of FIG. 4C, an UI object for instructing to create the adjustment sheet, for example, a start button is displayed. When the start button is touched by the user, the UI 103 receives the touching as the instruction to create the adjustment sheet. The controller 101 starts creating the adjustment sheet.

In step S2, the folding unit 108 folds the sheet in the selected folding manner. For example, when "half-fold" is selected, the folding unit 108 folds the sheet at a reference folding position corresponding to the half-fold. In another example, when "tri-fold" is selected, the folding unit 108 folds the sheet at a reference folding position corresponding to the tri-fold. The storage 102 stores the reference folding position for each sheet folding manner and each sheet type.

In step S3, the UI 103 displays a guide screen. Here, the "guide screen" refers to a screen that prompts the user to place the adjustment sheet on the image reader 106. Details of a process of generating the guide screen will be described later. According to the guidance, the user takes out the adjustment sheet from the discharge tray 58 and places the adjustment sheet on the image reader 106. On the guide screen, an UI object for starting reading of the adjustment sheet, for example, the start button is displayed. When the start button is touched by the user, the UI 103 receives the touching as an instruction to read the adjustment sheet.

When the UI 103 receives the input of the reading instruction from the user, the image reader 106 starts reading the adjustment sheet in step S4.

In step S5, the controller 101 detects the folding deviation amount. A method of detecting the folding deviation amount will be described. To detect the folding deviation amount, the controller 101 uses the image of the adjustment sheet read by the image reader 106.

Figure 5A:
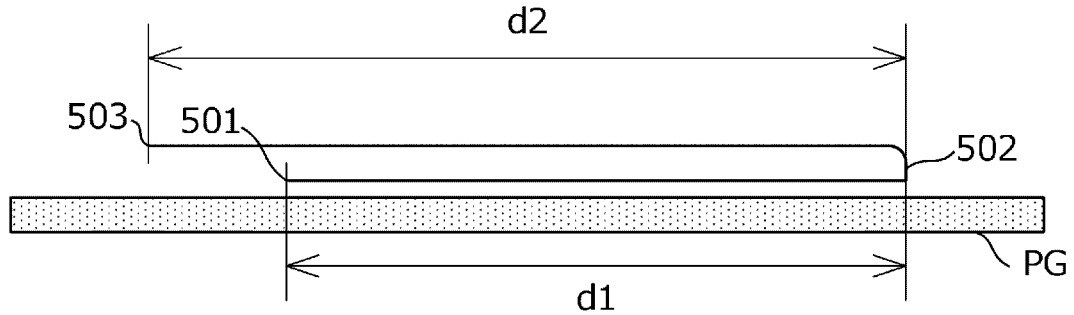
FIGS. 5A to 5C are diagrams showing an example of a folding manner that allows detecting of a folding deviation amount without unfolding a sheet.
Figure 5B:
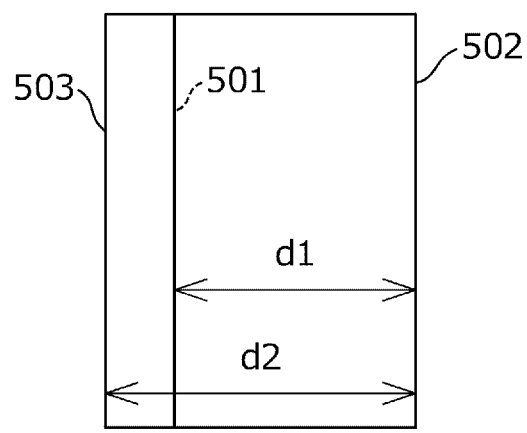
Figure 5C:
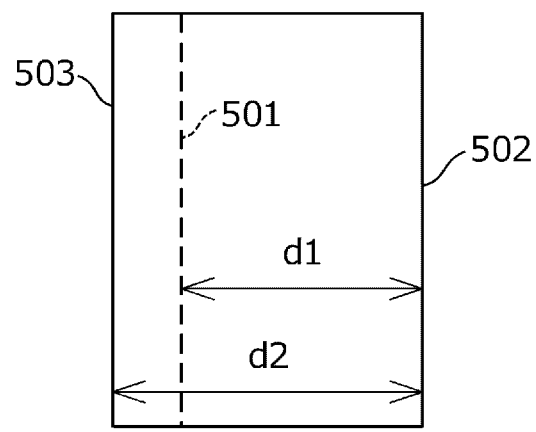

FIGS. 5A to 5C are diagrams showing an example of reading a half-folded sheet. The controller 101 detects the folding deviation amount based on sheet edges, an actual folding position, and a folding length appearing on the image. Here, the "sheet edges" refers to sides parallel to a folding line among sides constituting edges of the sheet. That is, one sheet has two sheet edges. The "folding length" refers to the shortest length from a sheet edge to the reference folding position on a folded sheet.

FIG. 5A shows a cross section perpendicular to the platen glass PG and perpendicular to the folding line of the sheet. Of surfaces of the folded sheet, a surface facing the platen glass PG will be referred to as a "front surface", and an opposite surface to the front surface will be referred to as a "back surface". FIG. 5B shows an image of the front surface, and FIG. 5C shows an image of the back surface.

The controller 101 analyzes the image obtained by reading the sheet and specifies a line that is inside the sheet (that is, inside an outer shape of the sheet) and extends from one end to another end. A surface on which the line appears depends on the folding manner. For example, the storage 102 stores a table in which an identifier of the folding manner, a surface to be read, and a line appearing inside the sheet are associated with one other.

FIG. 6 is a table showing a relationship among lines obtained by the image analysis, a sheet edge(s), and a folding line(s). Here, the "division number" refers to the number of areas (per surface) into which a surface is divided by folding the sheet. For example, in half fold, one surface of the sheet is divided into two areas. The controller 101 specifies the sheet edges and the folding line(s) with reference to the folding manner information and the table. In most cases, it would be possible to detect a line inside the sheet (more specifically, a line extending from one end to another end and parallel to one side of the outer shape of the sheet) on at least one of the front surface or the back surface. The controller 101 specifies, by referring to the table of FIG. 6, which each of (i) a side that is parallel to and closer to the detected inside line among the sides constituting the outer shape of the sheet on the surface on which at least the line inside the sheet is detected and (ii) a side that is parallel to and farther away from the detected inside line among the sides constituting the outer shape of the sheet on the surface on which at least the line inside the sheet is detected corresponds to a sheet edge or a folding line.

The surface on which the line inside the sheet appears is determined in accordance with the folding manner. For example, as in the example of FIGS. 5A and 5B, when a sheet is half-folded, the line inside the sheet appears only on either the front surface or the back surface. According to the table, the controller 101 defines a surface on which the line inside the sheet is detected as a "first surface", and a surface opposite to the first surface as a "second surface". Whether a front surface of the read image corresponds to the first surface or the second surface and whether a back surface of the read image corresponds to the first surface or the second surface depend on an orientation of the sheet when the sheet is placed on the platen glass PG. In the example of FIG. 5B, the controller 101 specifies a side (that is, a sheet edge 503) closer to an inside line 501 (that is, one sheet edge) on the first surface as another sheet edge, and specifies a farther side (that is, a folding line 502) as a folding line.

Figure 7A:
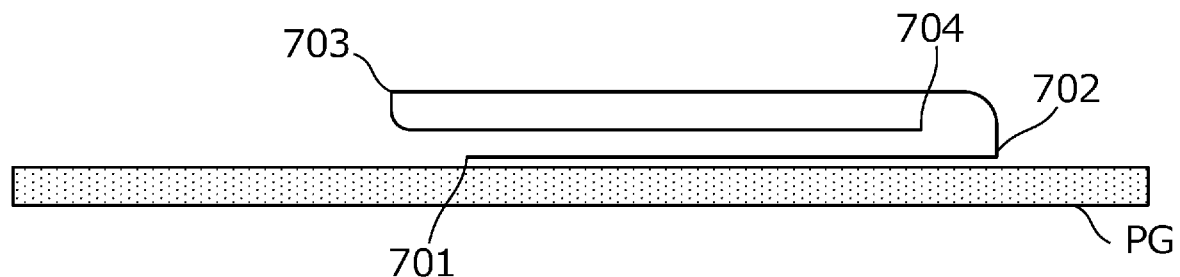
FIGS. 7A to 7C are diagrams showing an example of reading a tri-folded sheet.
Figure 7B:
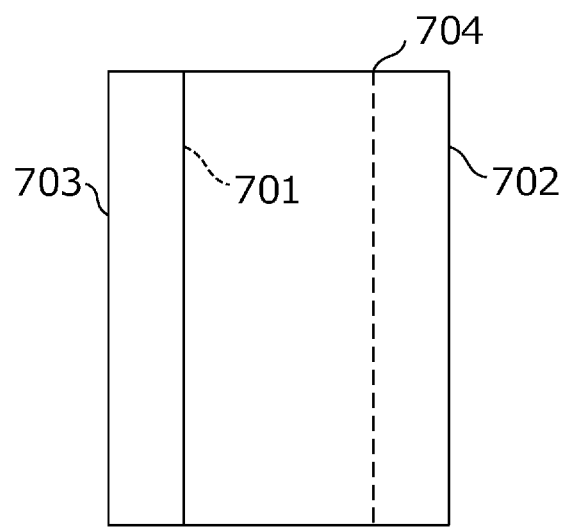
Figure 7C:
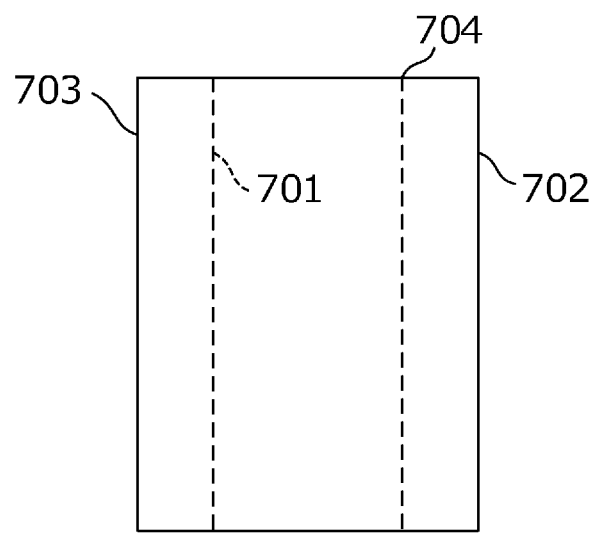

FIGS. 7A to 7C are diagrams showing an example of reading a tri-folded sheet. FIG. 7A shows a cross section perpendicular to the platen glass PG and perpendicular to folding lines of the sheet. FIG. 7B shows a read image of a front surface, and FIG. 7C shows a read image of a back surface. Since the folding manner is tri-fold, lines inside the sheet appear only on either the front surface or the back surface. According to the table in FIG. 6, the controller 101 defines a surface on which the lines inside the sheet are detected as a first surface, and a surface opposite to the first surface as a second surface. The controller 101 specifies a side (that is, a folding line 703) closer to an inside line 701 (that is, one sheet edge) on the first surface as one folding line, and specifies a farther side (that is, a folding line 702) as another folding line. The other sheet edge 704 is hidden and is invisible on either of the first surface and second surface. The table of FIG. 6 is premised on that when the sheet is unfolded, lines are arranged in an order of a sheet edge 1, a folding line 1, a folding line 2, and a sheet edge 2 from the sheet edge 1.

Then, how to detect the folding deviation amount and how to adjust the folding position will be described. First, the controller 101 specifies the reference folding position. For example, when a sheet is half-folded (that is, a surface is divided into two areas), the reference folding position is a position at which the sheet is divided in half, that is, a midpoint of a side perpendicular to the folding line.

In the example of FIG. 5B, a reference folding position of the folding line 502 is a midpoint of a side perpendicular to the folding line 502 (in a state where the sheet is unfolded). That is, a distance d1 from the folding line 502 to the sheet edge 501 and a distance d2 from the folding line 502 to the sheet edge 503 are ideally equal to each other. However, distances actually measured in the example of FIG. 5B are d1<d2. A folding deviation amount Δd is Δd=d2−d1. The controller 101 adjusts the folding position such that the folding deviation amount decreases and ideally becomes zero.

In the example of FIG. 5B, the controller 101 may simply move the folding line 502 to approach the sheet edge 503. For example, an approaching amount, that is, an adjustment amount δ1, is δ1=Δd/2.

In the example of FIG. 5C, a reference folding position of the folding line 502 is a bisecting point on a side perpendicular to the folding line 502 (in a state where the sheet in unfolded). In this case, it is necessary to know a length of the side perpendicular to the folding line 502 in a state where the sheet is unfolded. However, when only one surface (that is, either the first surface or the second surface) of the half-folded sheet is read and only one sheet edge appears on the read surface (that is, when an image obtained by reading the sheet is only the image shown in FIG. 5C), one sheet edge 501 is hidden and is invisible. As a result, the distance d1 from the folding line 502 to the sheet edge 501 cannot be measured. In this case, the controller 101 specifies the length of the side of the sheet (that is, d1+d2) by using the identifier of the sheet included in the folding manner information. Specifically, the storage 102 stores information that associates the identifier of the sheet and the length of the side of the sheet with each other. The controller 101 specifies the length of the side of the sheet with reference to this information. The controller 101 adjusts the folding position so as to approach a position at which the specified length of the side is divided in half. The approaching amount, that is, the adjustment amount δ2 is similar to that in the example of FIG. 5B.

In the example of FIGS. 7A to 7C, a reference folding position of the folding line 702 is a trisection point on a side perpendicular to the folding line 702 (in a state where the sheet in unfolded). In this case, it is necessary to know a length of the side perpendicular to the folding line 702 in a state where the sheet is unfolded. However, when the sheet is tri-folded as in the example of FIG. 7B, one sheet edge 704 is hidden and is invisible. As a result, the length of the side perpendicular to the folding line 702 cannot be measured. In this case, the controller 101 specifies the length of the side of the sheet by using the identifier of the sheet included in the folding manner information. Specifically, the storage 102 stores the information that associates the identifier of the sheet and the length of the side of the sheet with each other. The controller 101 specifies the length of the side of the sheet with reference to this information. The controller 101 adjusts the folding position so as to approach a position at which the length of the specified side is divided into thirds. It is noted that the controller 101 cannot specify the folding position only from an image read from a surface where both sheet edges are hidden and are invisible as shown in FIG. 7C. Thus, depending on the folding manner, the folding deviation amount cannot be detected only based on an image of one surface.

Figure 8A:
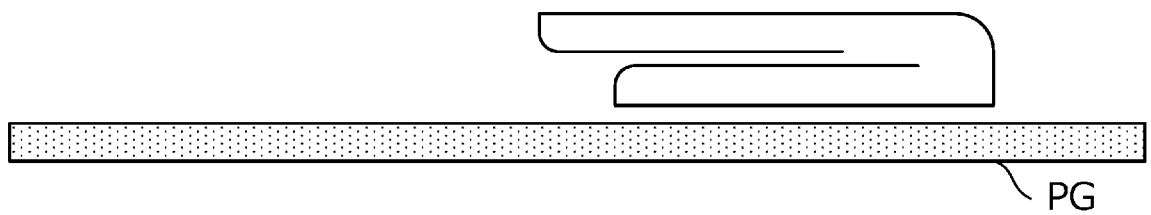
FIGS. 8A and 8B are diagrams showing examples of a folding manner that does not allow detecting of the folding deviation amount unless the sheet is unfolded.
Figure 8B:
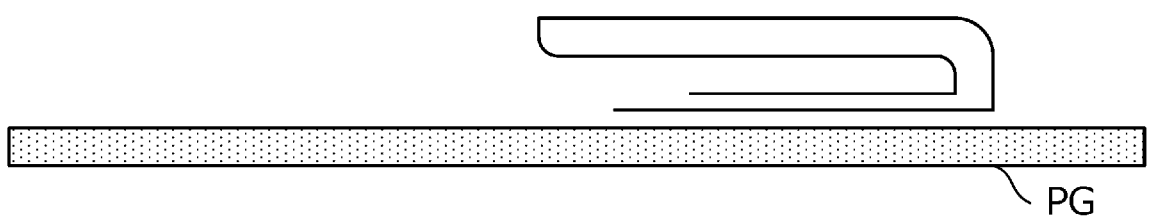

FIGS. 8A and 8B are diagrams showing examples of a folding manner that does not allow detecting of the folding deviation amount unless the sheet is unfolded. FIG. 8A illustrates an example of an 8-page gate folded sheet, and FIG. 8B illustrates an example of a double parallel folded sheet. As in the examples of FIGS. 8A and 8B, when the sheet is folded in the folding manner that hides the sheet edge or the divided areas so as to be invisible, a length of a side of the sheet cannot be measured in at least a part of the areas on either the front surface and the back surface. Therefore, even if the user wants to adjust the folding position based on the measurement, the folding position cannot be adjusted with the sheet folded.

Figure 9A:
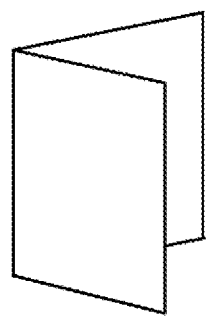
FIGS. 9A to 9G are diagrams showing examples of the sheet folding manner.
Figure 9B:
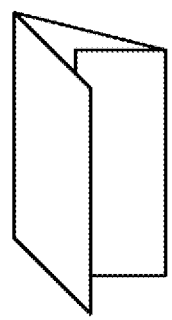
Figure 9C:
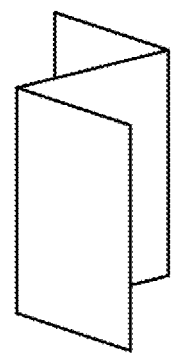
Figure 9D:
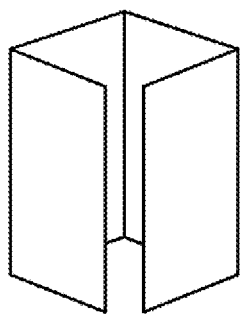
Figure 9E:
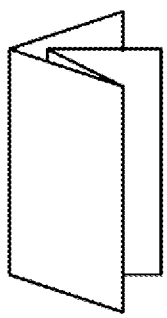
Figure 9F:
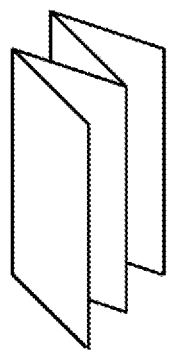
Figure 9G:
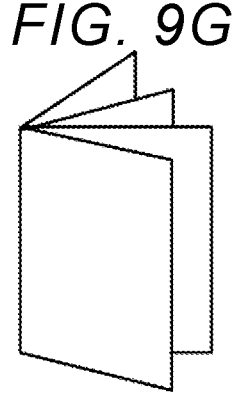

In order to address such a case, for the sheet that is folded in a specific folding manner, the image forming apparatus 1 prompts (guides) the user to unfold the sheet and place the sheet on the platen glass PG. Examples of the folding manner that does not allow adjusting of the folding position with the sheet folded include 8-page gate fold (see FIG. 9D), double parallel fold (see FIG. 9E), 8-page accordion fold (W-fold) (see FIG. 9F), and bookbinding (booklet) (see FIG. 9G).

FIGS. 9A to 9G are diagrams showing examples of sheet folding manners. FIGS. 9A to 9F show half fold, tri-fold (6-page gate fold), 6-page accordion fold (Z-fold), 8-page gate fold, double parallel fold, and 8-page accordion fold (W-fold), respectively.

The half-fold (see FIG. 9A), tri-fold (see FIG. 9B), and 6-page accordion fold (Z-fold) (see FIG. 9C) are examples of a folding manner that allows detecting of the folding deviation amount without unfolding the sheet. On the other hand, the 8-page gate fold (see FIG. 9D), double parallel fold (see FIG. 9E), and 8-page accordion fold (W-fold) (see FIG. 9F) are examples of the folding manner that does not allow detecting of the folding deviation amount with the sheet folded. Here, the "folding manner that allows detecting of the folding deviation amount without unfolding the sheet" is a folding manner that allows specifying of sheet edges and a folding length at least in an image obtained by reading one surface of a folded sheet. An example of this folding manner is a folding manner in which the number of folding lines on the sheet is two or less. On the other hand, the "folding manner that does not allow detecting of the folding deviation amount cannot unless the sheet is unfolded" is a folding manner that does not allow specifying of a sheet edge nor a folding length in images obtained by reading both sides of a folded sheet (for example, sheet edges are hidden and are invisible). An example of this folding manner is a folding manner in which the number of folding lines on the sheet is three or more.

In step S6, the controller 101 calculates an adjustment value for correcting the folding deviation, based on the read image of the adjustment sheet. Here, the "adjustment value" indicates a length by which the controller 101 moves the folding position to decrease the folding deviation amount. Specifically, the controller 101 specifies the position(s) of the sheet edge(s), specifies the actual folding position(s), and measures the folding length(s), based on the read image.

The controller 101 (specifically, the calculator 107) calculates the adjustment value based on the specified position(s) of the sheet edge(s), the specified actual folding position(s), and the measured folding length(s). In the example of FIG. 5B, the adjustment value for half-fold is obtained as follows.

Folding Length=50
$d1$=40 (from sheet edge 501 to actual folding position 502)
$d2$=60 (from actual folding position 502 to sheet edge 503)
Folding Deviation Amount $\Delta d$=60−40=20
Adjustment Amount $\delta$=20/2=10

In the example of FIG. 5C, the adjustment value for half-fold is obtained as follows.

Sheet Length ($d1+d2$)=100
$d2$=60 (from actual folding position 502 to sheet edge 503)
$d1$=100−60=40
Folding Deviation Amount $\Delta d$=60−40=20
Adjustment Amount $\delta$=20/2=10

Refer back to FIG. 3 again. In step S6, the controller 101 adjusts the folding unit 108 based on the calculated adjustment value such that the folding deviation amount decreases, so as to adjust the folding deviation.

Figure 10:
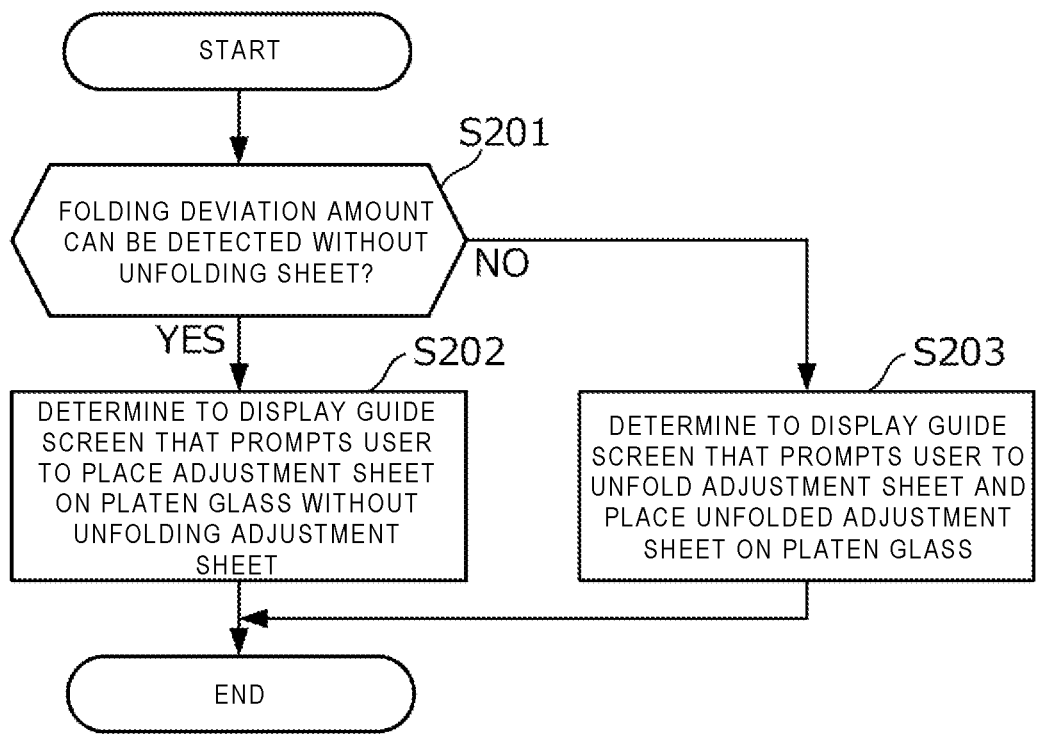
FIG. 10 is a flowchart of an example of a process of generating a guide screen.

FIG. 10 is a flowchart of an example of a process of generating a guide screen displayed in step S3. The process is performed, for example, between steps S2 and S3.

In step S201, the controller 101 (specifically, the determination unit 104) determines the method of detecting the folding deviation amount detection, based on (i) the folding manner information and (ii) the information stored in the storage 102. The storage 102 stores, for each of the plural folding manners in which the folding unit 108 can fold a sheet, information indicating that each folding manner is (i) a folding manner that allows detecting of a folding deviation amount without unfolding the sheet (that is, with the sheet folded) or (ii) a folding manner that does not allow detecting of a folding deviation amount unless the sheet is unfolded (that is, does not allow detecting of the folding deviation amount with the sheet folded).

The determination unit 104 reads the information corresponding to the identifier of the folding manner included in the folding manner information from the storage 102, and determines whether the folding manner is one that allows detecting of the folding deviation amount without unfolding the sheet.

When the determination unit 104 determines that the sheet folding manner is the folding manner that allows detecting of the folding deviation amount without unfolding the sheet (step S201: YES), that is, when the determination unit 104 determines that the sheet folding manner is a folding manner that allows reading of a folding position on a medium even with the medium folded, the controller 101 displays, on the UI 103, a guide screen that prompts the user to place the sheet without unfolding the sheet. On the other hand, when the determination unit 104 determines that the sheet folding manner is not the folding manner that allows detecting of the folding deviation amount without unfolding the sheet (step S201: NO), the controller 101 displays, on the UI 103, a guide screen that prompts the user to unfold the sheet and place the sheet.

When the controller 101 determines to use the method of detecting the folding deviation amount without unfolding the sheet (S201: YES), the process proceeds to step S202. On the other hand, when the controller 101 determines to use the method of detecting the folding deviation amount with unfolding the sheet (S201: NO), the process proceeds to step S203.

When the process proceeds to step S202 from step S201 (S201: YES), the controller 101 determines to display, on the UI 103, a guide screen that prompts the user to place the adjustment sheet on the platen glass PG without unfolding the adjustment sheet.

Figure 11A:
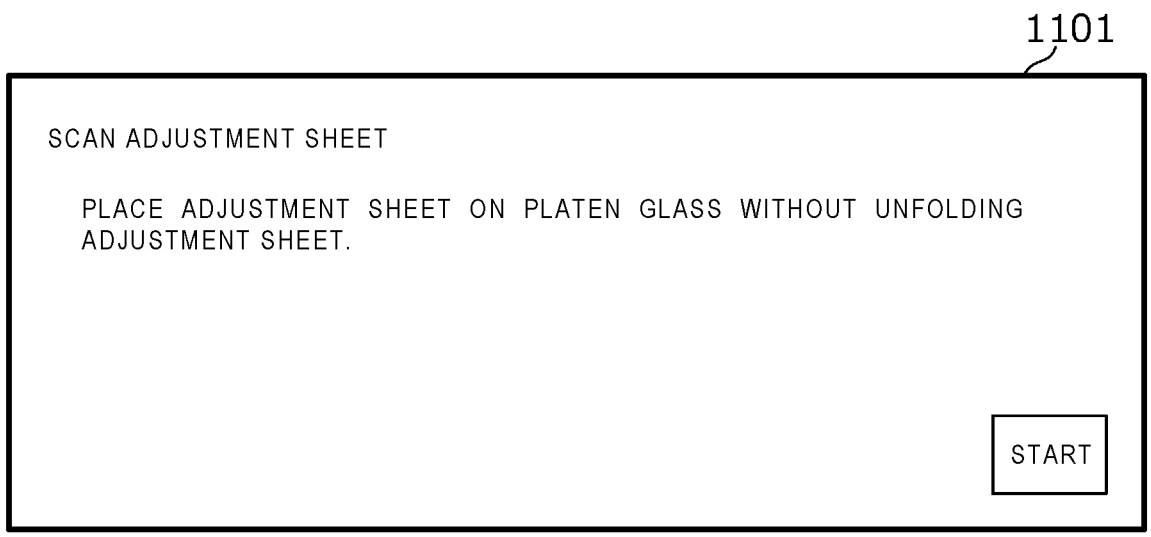
FIGS. 11A and 11B are examples of the guide screen that prompts a user to place an adjustment sheet on a platen glass.
Figure 11B:

FIGS. 11A and 11B are diagrams showing examples of the guide screen that prompts the user to place the adjustment sheet on the platen glass. FIG. 11A is a diagram showing an example of a guide screen that is displayed on the UI 103 and that prompts the user to place the adjustment sheet on the platen glass PG without unfolding the adjustment sheet. A guide screen 1101 includes, for example, an instruction such as "Place the adjustment sheet on the platen glass without unfolding the adjustment sheet", and an UI object for instructing to read the adjustment sheet, for example, a start button.

On the other hand, when the process proceeds from step S201 to step S203 (S201: NO), the controller 101 displays, on the UI 103, a guide screen that prompts the user to unfold the adjustment sheet and place the unfolded adjustment sheet on the platen glass PG. FIG. 11B is a diagram showing an example of a guide screen that is displayed on the UI 103 and that prompts the user to unfold the adjustment sheet and place the unfolded adjustment sheet on the platen glass PG. A guide screen 1102 includes, for example, an instruction such as "Unfold the adjustment sheet and place the unfolded adjustment sheet on the platen glass".

2-2. Second Example

In a second example, in addition to or instead of displaying the guide screen on the UI 103, a guide image is formed on the adjustment sheet. Here, the "guide image" refers to an image or a text that prompts the user to place the adjustment sheet on the image reader 106.

In step S201, when the determination unit 104 determines that the sheet folding manner is a folding manner that allows detecting of the folding deviation amount without unfolding the sheet (step S201: YES), the controller 101 displays, on the UI 103, the guide screen that prompts the user to place the sheet without unfolding the sheet. The controller 101 controls the image forming unit 105 to form, on a sheet, the guide image that prompts the user to place the sheet without unfolding the sheet. The image forming apparatus 1 forms the guide image on a surface of the sheet which is an outer surface when the sheet is folded.

On the other hand, when the determination unit 104 determines that the sheet folding manner is a folding manner that does not allow detecting of the folding deviation amount unless the sheet is unfolded (step S201: NO), the controller 101 displays, on the UI 103, the guide screen that prompts the user to unfold the sheet and place the unfolded sheet. The controller 101 controls the image forming unit 105 to form, on a sheet, the guide image that prompts the user to unfold the sheet and place the unfolded sheet. The image forming apparatus 1 forms the guide image on a surface of the sheet which is an inner surface or an outer surface when the sheet is folded.

Figure 12A:
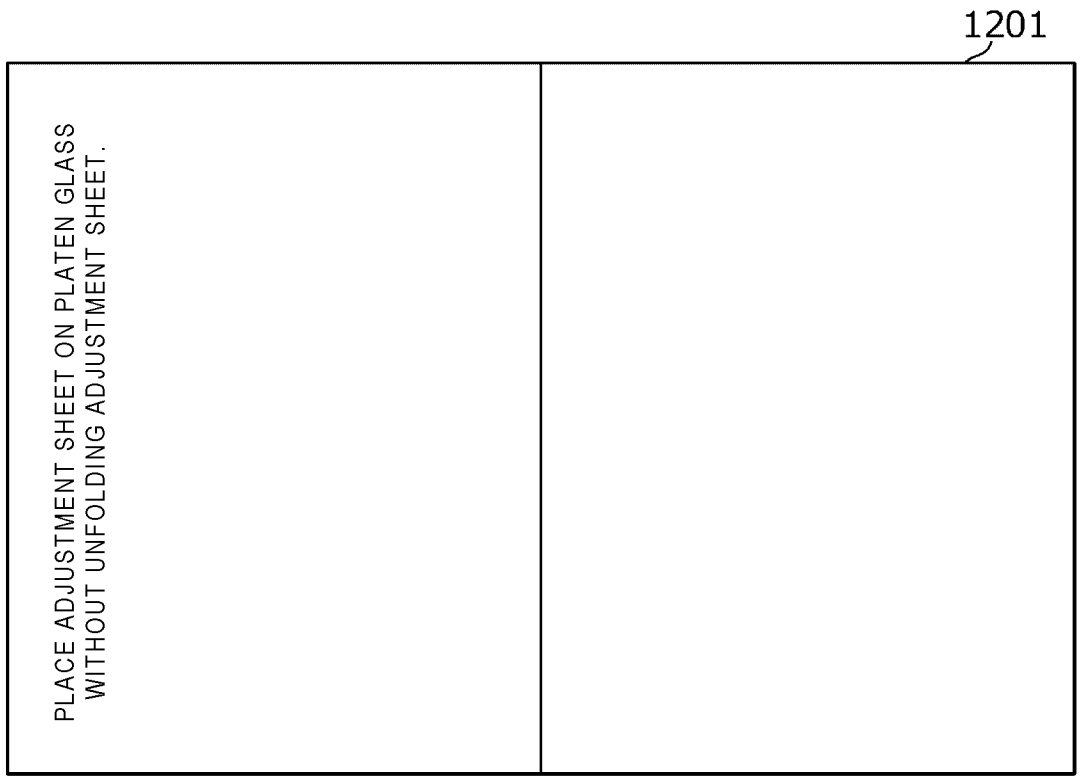
FIGS. 12A and 12B are examples of a sheet on which the guide image is formed.
Figure 12B:
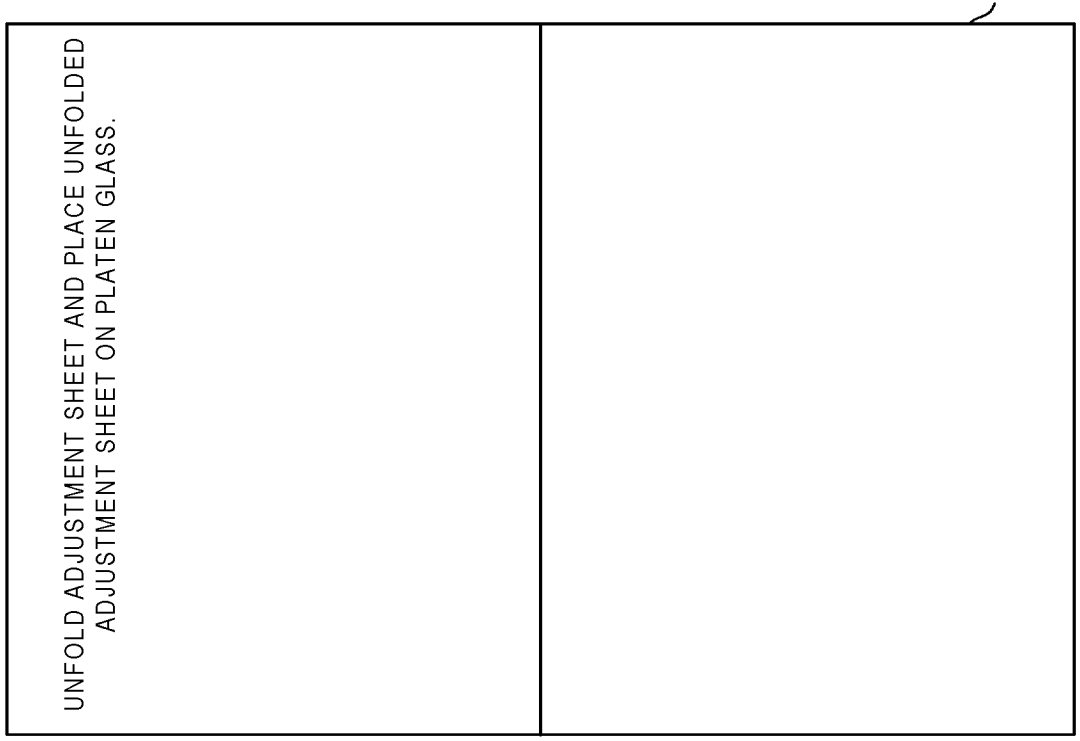

FIGS. 12A and 12B are diagrams showing examples of the sheet on which formed is the guide image that prompts the user to place the adjustment sheet on the platen glass. FIG. 12A is a diagram showing an example of the sheet on which formed is the guide image that prompts the user to place the adjustment sheet on the platen glass without unfolding the adjustment sheet. A guide image 1201 includes, for example, an instruction such as "Place the adjustment sheet on the platen glass without unfolding the adjustment sheet". FIG. 12B is a diagram showing an example of the sheet on which formed is the guide image that prompts the user to unfold the adjustment sheet and place the adjustment sheet on the platen glass without being unfolded. A guide image 1202 includes, for example, an instruction such as "Unfold the adjustment sheet and place the unfolded adjustment sheet on the platen glass".

3. Modifications

The present disclosure is not limited to the exemplary embodiments described above. Various modifications may be made. Hereinafter, a couple of modifications will be described. Two or more items described in the following modifications may be used in combination.

3-1. Folding Manner Information

The controller 101 may infer a folding manner based on a read sheet image, instead of acquiring the folding manner information from the user or the folding device. The controller infers the folding manner, for example, based on features such as the number or positions of the sheet edge(s), the folding line(s), or the folding length(s) appearing in the read sheet image.

3-2. Automatic Sheet Reading

When the folding manner allows detecting the folding position with the sheet folded, the image forming apparatus 1 may automatically transport the sheet to the image reader 106 instead of letting the user place the sheet. In this case, the UI 103 may not display a guide screen.

3-3. Hardware Configuration

The hardware configuration of the image forming apparatus 1 is merely an example. Any hardware configuration may be used. For example, the image forming apparatus 1 and the folding device (that is, the folding unit 108) may be separated from each other.

3-4. Others

The program to be executed by the controller 101 may be provided in a form of a recording medium such as an optical disc that stores the program. Alternatively, the program to be executed by the controller 101 may be downloaded to a computer via a communication line such as the Internet, installed in the computer and made available.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical apps, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
acquire information on a folding manner in which a folding device folds a medium;
when the folding manner does not allow reading of a folding position of the medium with the medium folded, cause a display to display information so as to prompt a user to unfold and read the medium; and
when it is determined that the folding manner is a folding manner in which the folding position of the medium can be read even with the medium folded, to cause the display to display information so as not to prompt the user to unfold and read the medium.

2. The information processing apparatus according to claim 1, wherein the information on the folding manner is an instruction given by the user to the folding device.

3. The information processing apparatus according to claim 1, wherein the information on the folding manner is information that is related to the folding manner in which the medium is folded of the medium and that is acquired from the folding device.

4. The information processing apparatus according to claim 1, wherein the processor is programmed to infer the folding manner based on an image of the medium obtained by an image reader reading the medium.

5. The information processing apparatus according to claim 1, wherein the processor is programmed to cause an image forming unit to form, on the medium, an image that prompts the user to unfold and read the medium.

6. The information processing apparatus according to claim 1 wherein the processor is programmed to cause an image forming unit to form, on the medium, an image that prompts the user to read the medium without unfolding the medium.

7. A non-transitory computer readable medium storing a program that causes a computer including a processor to execute information processing, the information processing comprising:

acquiring information on a folding manner in which a folding device folds a medium;

when it is determined that the folding manner does not allow reading of a folding position of the medium with the medium folded, causing a display to display information so as to prompt a user to unfold and read the medium; and when it is determined that the folding manner is a folding manner in which the folding position of the medium can be read even with the medium folded, causing the display to display information so as not to prompt the user to unfold and read the medium.

8. An information processing apparatus comprising:

acquiring means for acquiring information on a folding manner in which folding means folds a medium; and causing means for:

when it is determined that the folding manner does not allow reading of a folding position of the medium with the medium folded, causing display means to display information so as to prompt a user to unfold and read the medium; and when it is determined that the folding manner is a folding manner in which the folding position of the medium can be read even with the medium folded, causing the display to display information so as not to prompt the user to unfold and read the medium.

* * * * *